(12) United States Patent
Acharya

(10) Patent No.: US 6,233,358 B1
(45) Date of Patent: *May 15, 2001

(54) IMAGE COMPRESSION USING DIRECTIONAL PREDICTIVE CODING OF THE WAVELET COEFFICIENTS

(75) Inventor: Tinku Acharya, Tempe, AZ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/114,720

(22) Filed: Jul. 13, 1998

(51) Int. Cl.[7] ................................. G06K 9/36; G06K 9/46
(52) U.S. Cl. ............................ 382/248; 382/238; 382/251
(58) Field of Search ..................................... 382/238, 240, 382/248, 251; 348/398, 400, 401, 409, 410, 411

(56) References Cited

U.S. PATENT DOCUMENTS

| | | | | |
|---|---|---|---|---|
| 4,725,885 | * | 2/1988 | Gonzales et al. | 358/135 |
| 5,097,331 | * | 3/1992 | Chen et al. | 358/138 |
| 5,412,741 | * | 5/1995 | Shapiro | 382/232 |
| 5,764,805 | * | 6/1998 | Martucci et al. | 382/238 |
| 5,881,176 | * | 3/1999 | Keith et al. | 382/248 |
| 5,883,978 | * | 3/1999 | Ono | 382/248 |

* cited by examiner

Primary Examiner—Phuoc Tran
(74) Attorney, Agent, or Firm—Blakely, Sokoloff, Taylor & Zafman LLP

(57) ABSTRACT

What is disclosed is a method that includes determining the direction of most probable correlation of a transformed set of image data, and error encoding transformed data, the error determined between a transformed data value and a predicted neighbor data value in the determined direction. In an imaging apparatus that employs a DWT, or Discrete Wavelet Transform to compress an image, the direction of edges in the compressed data in used to generate a more highly correlated error image than typically provided for.

20 Claims, 5 Drawing Sheets

IMAGE COMPRESSION USING DIRECTIONAL PREDICTIVE CODING OF THE WAVELET COEFFICIENTS

BACKGROUND OF THE INVENTION

1. Field of the Invention

The invention relates generally to data and image compression. More specifically, the invention relates to encoding for data and image compression, particularly where discrete wavelet transforms are utilized.

2. Description of the Related Art

One crucial aspect of imaging is the process of image compression. In digital systems such as digital cameras image compression is utilized to store and transmit a large amount of image information in fewest number of bits possible while still maintaining an image quality that is acceptable. One example of a popular image compression scheme is JPEG (Joint Photographic Experts Group) which is based upon the Discrete Cosine Transform (DCT). Recently, new image compression schemes have been developed utilizing the Discrete Wavelet Transform (DWT). Unlike the DCT which is periodic in nature, the DWT is better suited and often more efficient in representing sharp discontinuities in data such as that present in image edge features. The DWT is also capable of fast and efficient hardware implementation, particularly for small portable devices such as digital cameras. The DWT resolves an input image into a series of "sub-bands" which are shown in FIG. 1. The four sub-bands labeled LL, HL, LH and HH, where H in the sub-band designation refers to the application of a high-pass part of the DWT and L to the low-pass portion. The DWT sub-bands and their properties are discussed in greater detail below.

A process known as DPCM (Differential Pulse Code Modulation) may be utilized to encode and compress data whether first exposed to a DWT or not. In DPCM, the goal is to encode the difference (error value) between one pixel (or data value) and the predicted value using the neighboring pixels. In this manner, a highly correlated data set can be encoded with a fewer number of bits (smaller values) since the differences between one value and next are presumably small in comparison to the values themselves. With a poorly correlated or high entropy data set, the encoding efficiency of DPCM decreases since the difference values (without taking the absolute value) could be less easy to encode than the original data. For instance, if the each value in the data set has a possible range of 0 to n, the differential may range from −n to +n, which would take more bits to encode if this differential range were fully utilized. In imaging, the DPCM technique of encoding is particularly advantageous in that edge features, those regions of an image with sharply different pixel values that define the edge, are encoded using more information and visually less significant information (number of bits), such as a slight shade or tone difference is encoded using less bits. DPCM, as currently employed, is a serial operation in that as a row of image or image sub-plane is scanned, the values are encoded. The encoding of values involves the discovery of an error image (between one pixel and a neighboring pixel or predicted value for the neighboring pixel) and then an encoding of the original image pixel values and the error image based upon the error. Such a system is shown in FIG. 2 and is described in detail below. Where the error is between one pixel and predicted neighboring pixel, the DPCM technique is specifically referred to as "predictive" coding. Since most image arrays scan or obtain all the values in one row and then the next, the pixel data is compiled in a west-to-east direction. Due to the row-based scanning that imaging devices often employ, DPCM considers neighboring pixels to be east-west neighbors. When it is desired that north-south pixels (i.e., those belonging to different rows) are also to be considered for the error image, the technique of DPCM does so uniformly across all pixels in the image.

If an original image obtained from a image scan or from raw image data that is already stored uses DPCM, the arbitrary choice of a direction or set of directions for the error image generation is not easily avoided. However, where a DWT is first applied to the image data, the sub-band data rather than the original image should be encoded. In such an instance, there are features in the DWT which may aid in determining the best direction for error discovery during DPCM so that the encoded DWT image is smaller (uses even fewer bits) than would an arbitrary direction (or set of directions). Since a DWT processed image has certain predictable behavior in its sub-bands, this information can be exploited to reduce the size of the encoded image.

Thus, there is a need for a DPCM technique that is suited to and takes advantage of DWT behavior and is deliberate in the consideration of direction for error discovery and encoding.

SUMMARY OF THE INVENTION

A method comprising determining the direction of most probable correlation of a transformed set of image data, and error encoding transformed data, the error determined between a transformed data value and a predicted neighbor data value in the determined direction.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
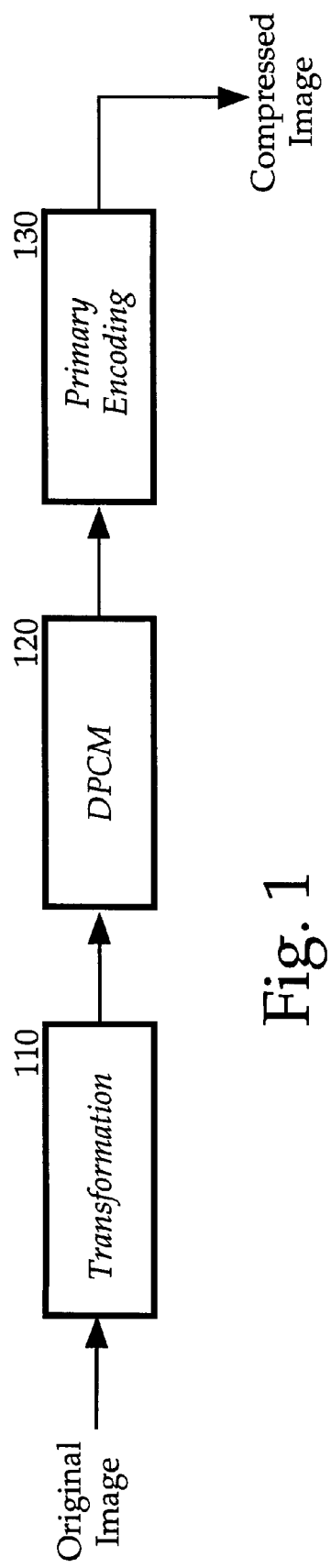
FIG. 1 illustrates a lossy image compression scheme.

Typical image compression provides at the decompression stage only an approximation of the original image. This approximation may match more or less closely the original image based in part upon the particular image compression scheme utilized. Such a lossy image compression scheme will have a data flow as that shown in FIG. 1. Each of the blocks shown in FIG. 1 are functionally represented and may be implemented in hardware, software or firmware or a combination thereof.

First, either by pixels or groups of pixels, an original image is passed through a transformation block 110. The transformation, according to one embodiment of the invention, is the performing of a DWT (Discrete Wavelet Transform) to generate several image sub-bands (see FIG. 2 and associated description). After the original image transformed, the transformed data such as sub-band data is then subjected to DPCM (Differential Pulse Code Modulation) which generates an error data set from the transformed data (block 120).

The error image is a set of difference (between the original pixel and an approximation or prediction of neighboring pixels) pixels. The use of an error image will tend to reduce the need to encode pixel values that are highly correlated to neighboring pixels and are thus redundant in that they offer no significant image details. By transforming the original image into an error image, perfectly correlated neighboring pixels (no light intensity variation) might be represented as zeros instead of as two identical pixel color/intensity values that are probably greater than zero. This reduces the total number of bits that would be required to represent the image, and the higher the correlation and redundancy, the lower the compression "ratio" (the size in bits of the original image proportional to the size in bits of the compressed image). After the error data set is generated, both the error data set and transformed data are binary encoded (130) using, for example, Huffman and/or run-length encoding schemes.

According to one embodiment of the invention, the DPCM (block 120) is performed taking into account the behavior of the DWT and the sub-band characteristics resulting therefrom. Each sub-band has directional edge properties that favor edges being one direction rather than another. This directional property of the various sub-bands can be exploited, according to one embodiment of the invention, when the error data set is generated. As a result, the error data set will be smaller in size than the error data obtained by an arbitrary direction applied to all sub-bands uniformly. Advantageously, the final compressed image is smaller in size in that it conveys the most relevant image information and ignores the rest. The directional characteristics of each sub-band allow the DPCM procedure to discover better the correlated data within a sub-band and utilizes that correlation to reduce the error image.

The DPCM (block 120) of the image may also include quantization according to at least one embodiment of the invention. Quantization is the procedure of mapping a set of M values to a set of N values, where N<M. By quantizing, the total number of possible data values for the data set are reduced. The mapping is achieved according to some mathematical formula such as y=x/2, where x is the data value and y is the quantized value. Using quantization to reduce the possible size of data values, the number of total bits needed to represent the image is diminished.

The above functional blocks, 110–130, illustrate a compressor function the objective of which is to reduce the memory requirements of storing and transferring image data. Depending upon the methodology used for transformation, quantization and encoding, the compression ratio, which the size of the original image divided by the size of the compressed image, will vary. This embodiment of the invention provides for an enhanced error encoding mechanism during DPCM that can serve to advantageously optimize the compression ratio. The decompression of the image may be achieved by reversing the procedure outlined above, and performing an Inverse DWT upon decoded image data.

Figure 2:
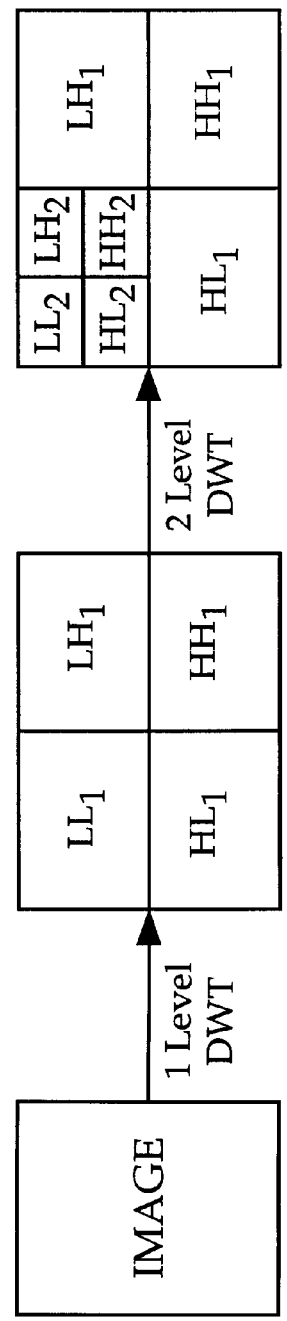
FIG. 2 illustrates the sub-band(s) resulting from a DWT operation upon an image.

FIG. 2 illustrates the sub-band(s) resulting from a DWT operation upon an image. The DWT is a "discrete" algorithm, and thus approximates the input signal by discrete samples of a full wavelet. Thus, with these discrete sample points, the DWT can be thought of as also being a filter with well-defined coefficients. Unlike the Fourier transforms or averaging filters, the Wavelet coefficients can be selected to suit particularly the application, or type of input signal. The DWT chosen in at least one embodiment of the invention is the 9-7 bi-orthogonal splines filter DWT. Since the DWT is discrete, the DWT can be implemented using digital logic such as Very Large Scale Integration (VLSI) circuits and thus can be integrated on a chip with other digital components. Thus, the DWT can easily be implemented in an imaging device such as a digital still or video camera. The ability of the DWT to better approximate the features of an image make it ideal for image compression. Further, as shown and described below, an architecture for DWT can be implemented efficiently for high data throughput, unlike Fourier or averaging techniques which require multiple cycles or iterations to generate a single output datum.

The essence of what is known commonly as a two-dimensional DWT is to decompose an input signal into four frequency (frequency refers to the high-pass (H) or low-pass (L) nature of the filtering) sub-bands. The two-dimensional DWT creates four sub-bands, LL, LH, HL and HH, with a total number of data values each ¼ of the input data. The DWT is multi-resolution technique such that the result data from one iteration of the DWT may be subjected to another DWT. Each iterated "level" of resolution is obtained by applying the DWT upon the "LL" sub-band generated by the previous level DWT. This is made possible since the LL sub-band contains almost all essential image features and can be considered a scaled version of the previous level LL sub-band (or the original full image in a one-level DWT). With this "multi-resolution" capability of the DWT, each sub-band can further be divided into smaller and smaller sub-bands as is desired.

Each DWT resolution level k contains 4 sub-bands, $LL_k$, $HL_k$, $LH_k$ and $HH_k$. The first level of DWT resolution is obtained by performing the DWT upon the entire original image, while further DWT resolution (level k+1) is obtained by performing the DWT on the $LL_k$ sub-band. The $LL_k$ sub-band contains enough image information to substantially reconstruct a scaled version of the image. The $LH_1$ sub-band contains horizontal or east-west oriented edges in the original image. Thus, the $LH_1$ will have east-west data values that are more highly correlated, in general, than north-south neighboring data. As shown below, this property of the $LH_1$ sub-band may be utilized during DPCM to decrease the entropy and size due to the error image. The $HL_1$ sub-band, on the other hand, contains vertical or north-south oriented edges in the original image. Thus, the $LH_1$ will have east-west data values that are more highly correlated, in general, than north-south neighboring data. As shown below, this property of the $HL_1$ sub-band may be utilized during DPCM to decrease the entropy and size due to the $HL_1$ error data. The $HH_1$ sub-band contains diagonally oriented edges which may be viewed of as a mere vector combination of horizontal edge information and vertical edge information. Thus, the $HH_1$ sub-band will have diagonally related values that are more correlated than values than neighbor in merely a unique vector component direction (horizontal or vertical). As shown below, the $HH_1$ sub-band will be treated differently than the $HL_1$ or $LH_1$ sub-bands in that a two-dimensional DPCM will be utilized.

Likewise, for each of the 4 level 2 sub-bands resolved from applying the DWT to the $LL_1$ sub-band, there is a directional property in each level 2 sub-band corresponding to the directional property of the same sub-band in level 1. Thus, the $LH_2$ sub-band has horizontal edge information of the $LL_1$ sub-band image, and the $HL_2$ sub-band has vertical edge information of the $LL_1$ sub-band image. The $HH_2$ contains diagonal edge information like its counterpart $HH_1$, but from the $LL_1$ sub-band instead of the original base image. FIG. 2 only shows a 2-level DWT resolution. However, it may be desirable in some instances to provide even more DWT resolution such as three or four levels. In general, level K sub-band(s) have the following directional properties (if K=1, $LL_0$ refers to the original image):

$LL_k$—contains a scaled version of the $LL_{k-1}$ sub-band.

$LH_k$—contains horizontal edge information from the $LL_{k-1}$ sub-band image.

$HL_k$—contains vertical edge information from the $LL_{k-1}$ sub-band image.

$HH_k$—contains diagonal edge information from the $LL_{k-1}$ sub-band image.

At each level of DWT resolution, the DPCM process determines which direction the error should be computed from, thus increasing the likelihood of discovering more correlated data within the sub-band. The identity of the sub-band provides the information regarding the direction of edges and thus, the direction of highest probable correlation between values in the sub-band.

Figure 3:
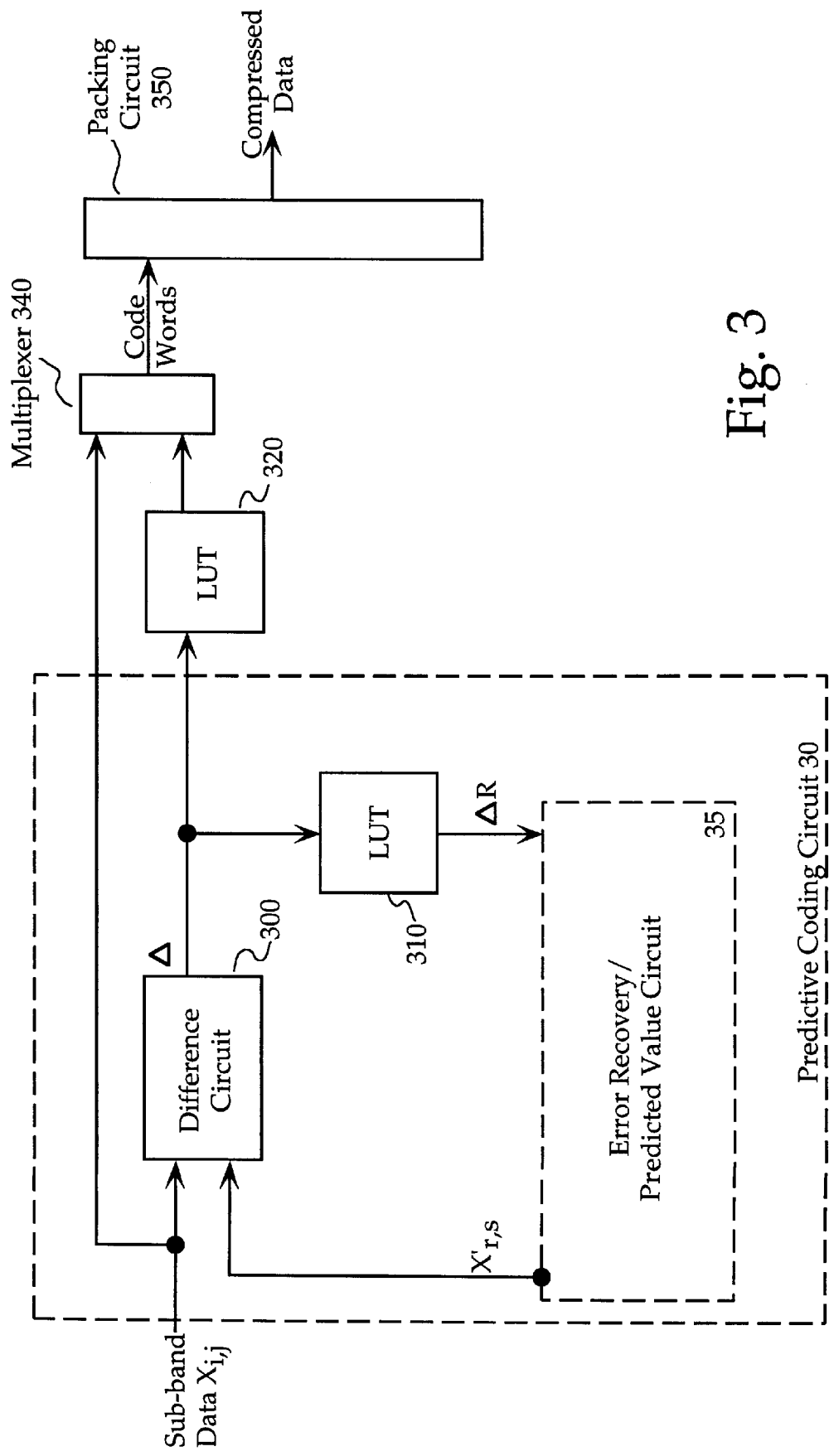
FIG. 3 illustrates DPCM carried out according to one embodiment of the invention.

FIG. 3 illustrates DPCM carried out according to one embodiment of the invention.

FIG. 3 represents a directional predictive coding (DPCM) system. FIG. 3 is distinguishable from typical image compression systems in several ways. To summarize, first, a directional predictive coding circuitry is utilized and second, look-up tables are employed to perform quantization and binary encoding. The apparatus of FIG. 3 is advantageous in that the predictive coding employs an intelligence that exploits the correlation of data within a sub-band more effectively by considering a different direction of error prediction for each sub-band.

FIG. 3 shows as input sub-band data value $X_{i,j}$ which originates from a DWT circuitry or other components of an image capture device or port configured to communicate information. Each $X_{i,j}$ is input to a difference circuit 300. Difference circuit 300 computes the difference between a predicted neighboring value $X'_{r,s}$ and the actual sub-band data $X_{i,j}$. The difference circuit 300 generates and provides as output a value $\Delta=X_{i,j}-X'_{r,s}$, which is referred to as the "error" or delta value. Each sub-band data value $X_{i,j}$ has a neighboring predicted value $X'_{r,s}$ provided by the error recovery circuit 35. The neighboring predicted value $X'_{r,s}$ is fed back into the difference circuit to aid in computing the next predicted neighbor $X'$ and in reducing quantization error.

According to one embodiment of the invention, a predicted neighbor $X'_{r,s}$ will have an r and s value depending upon the directional property of the sub-band being encoded. For instance, since the data in sub-band LH contains horizontally oriented edge information, west neighboring data should be used in computing the error. Thus, for the sub-band LH, r=i and s=j-1 indicating that the west neighbor (same row, previous column in the data array) of $X_{i,j}$ is being considered for prediction and then compared with $X_{i,j}$ to compute the corresponding error. Since the data in sub-band HL contains vertically oriented edge information, north neighboring data (or predicted data) should be used in computing the error. Thus, for the sub-band HL, r=i-1 and s=j indicating that the north neighbor (same column, previous row in the data array) of $X_{i,j}$ is being considered for prediction and then is compared with $X_{i,j}$ to compute the corresponding error. For the HH sub-band, which contains diagonally oriented edge information, a combination of north and west neighbors to $X_{i,j}$ should be considered. One method of considering both neighbors, which have a good likelihood in an edge feature of being close in value, is to take an average of those neighbors such that $X'_{r,s}=(X'_{i,j-1}+X'_{i-1,j})/2$ for the HH sub-band. This value is then compared with $X_{i,j}$ to formulate the error.

Predictive coding circuit 30 includes a predicted value and error recovery circuit (PVER) 35 which generates a predicted value and recovers error due to quantizing. PVER 35 may include a logic network for determining, based on control signals that indicate which sub-band (LH, HL or HH) the data which is being encoded belongs to. Alternatively, this may be determined based upon which row and column (i and j) of data is currently being encoded. Such a logic network may include a counter, and/or a series of flip-flops and other state control mechanisms that track which row and column of data is being processed.

Predictive coding circuit 30 operates as follows. Difference circuit 300 generates a $\Delta$, which is a value representing the difference between $X_{i,j}$ and $X'_{r,s}$. This "error" value, $\Delta$, is used as an address to a look-up table (LUT) 310. LUT 310 is a look-up table to compute an inverse quantized value. LUT 310 can store both a quantized value and an inverse quantized value for a given $\Delta$ error value. The LUT 310 outputs a "recovered" error value $\Delta R$ to be used in error recovery circuit is shown in FIG. 3. The recovered error value $\Delta R$ output by LUT 310 is the result of both quantization and inverse quantization. For instance, an error value $\Delta$=96 may have a quantized value of 12. The quantized value 12, when inverse quantized will yield a recovered error value $\Delta R$, for example, of 98. It is this quantization loss that facilitates compression. The quantization formula which is used to compile the look-up table may result in many values such as 96 and 98 as well, mapping to a quantized value of 12. When inverse quantized, the value 12 will always yield, in the example given above, an inverse quantized value of 98, whether "12" was obtained from quantizing an error value of 96 or 98.

This loss, which is due to quantizing error values to a smaller set of values can potentially propagate through the entire row of pixels unless a recovery mechanism is applied. Error recovery circuit 35 seeks to reduce the propagation of loss due to quantization by feeding back and summing previous predicted neighbor values with current recovered error values $\Delta R$. Each predicted neighbor is essentially $X'_{r,s}$ (current)=$X'_{r,s}$ (previous)+$\Delta R$. PVER 35 is essentially the decompression or inverse of the forward image compression process. This simulates the reverse prediction occurring at the stage of decompression. As a result, the quantization loss for each data value remains localized for that value.

As mentioned above, predictive coding circuit 30 generates an error value $\Delta$ for each sub-band data value $X_{i,j}$. A second LUT 320 is employed to perform pseudo-fixed length encoding of the quantized error value. Again, for example, a $\Delta$=96 may have a quantized value of 12. LUT 320 will store the full range of possible $\Delta$ values as addresses to index the quantized value and its codeword (encoded value). The codewords sent out by the packer circuit contain sufficient information to represent a compressed image and can later be decompressed to recover a slightly modified version of the original captured image sent to the predictive coding circuit as the set of $X_{i,j}$ values for the entire DWT processed image.

Consider for instance, the LH sub-band which requires consideration of west neighboring predicted data values within the same sub-band. The very first data value (for instance, $X_{1,10}$) in the LH sub-band has no west neighbor within that sub-band. Thus, the error value associated with that data value would be the value itself. For the next data value $X_{1,11}$ being considered, the west "predicted" neighbor $X'_{1,10}$ is generated by PVER 35 as the recovered error $\Delta R_{1,10}$ (which is the error $\Delta_{1,10}$ quantized and then inverse quantized) added with the predicted value for $X_{1,10}$ which is zero. Thus the error $\Delta_{1,11}$ for $X_{1,11}$ is equal to $X_{1,11} - \Delta R_{1,10}$. For the next value $X_{1,12}$, the predicted value $X'_{1,11}$ used in calculating the error is the sum of recovered error value $\Delta R_{1,11}$ and the previous predicted value $X'_{1,10}$. Thus for the LH sub-band, in general: for an input data value $X_{i,j}$, $X'_{r,s} = X'_{r,s-1} + \Delta R_{r,s}$; and $\Delta_{i,j} = X_{i,j} - X'_{r,s}$, where r=i and s=j-1.

The HL sub-band, on the other hand, the north neighboring predicted data values within the same sub-band are considered. The very first data value in the HL sub-band (for instance, $X_{10,1}$) has no north neighbor within the sub-band. Thus, the error value associated with $X_{10,1}$ would be $X_{10,1}$ itself. For the next input data in the same column (since a vertical direction of edges is considered, the input data is processed column by column rather than row by row as with the LH sub-band) $X_{11,1}$ being considered, the north predicted neighbor $X_{10,1}$ is generated by PVER 35 as the recovered error $\Delta R_{10,1}$ (which is the error quantized and then inverse quantized) added with the predicted value for $X_{10,1}$ which was zero. Thus, the error $\Delta_{11,1}$ for $X_{11,1}$ is equal to $X_{11,1} - \Delta R_{10,1}$ $R_{10}$. For the next value $X_{12,1}$ the predicted value $X'_{11,1}$ used in generating the error $\Delta_{12,1}$ is the sum of the recovered error value $\Delta R_{11,1}$ and the previous predicted value $X'_{10,1}$. Thus, for the HL sub-band, in general, for an input data value $X_{i,j}$, $X'_{r,s} = X'_{r-1,s} + \Delta R_{r,s}$; and $\Delta_{i,j} = X_{i,j} - X'_{r,s}$, where r=i-1, and s=j.

For the HH sub-band data value, the same procedure outlined for the LH and HL occurs with the following exceptions. The input data is scanned row by row with the previous row stored in a buffer so that the north predicted neighbor can be averaged with the west neighbor. With the exception the very first row and column of data in the HH sub-band, the DPCM may be generalized as follows: for an input data value $X_{i,j}$, $X'_{r,s} = (X'_{r,s-1} + X_{r-1,s})/2 + \Delta R_{r,s}$; and $\Delta_{i,j} = X_{i,j} - X'_{r,s}$, where r=i-1, and s=j-1.

The final level LL sub-band data values are not quantized, but encoded directly. To facilitate this operation, a multiplexer 340 selects the quantized codeword provided by LUT 320 for all data values other than those in the last level LL sub-band and selects $X_{i,j}$ when the values belonging to all other sub-bands, at any level are to be encoded. The value selected by multiplexer 340, either the codeword from LUT 320 or $X_{i,j}$, is packed by packing circuit 350.

The LUT 320 can therefore be a simple addressable memory such as a RAM which uses a value $\Delta$ as an address to look-up the quantized/encoded codeword. Such a RAM look-up table is inexpensive in comparison to binary encoding circuitry that would be traditionally utilized to perform the same functionality. For applications such as still image capture with a portable digital camera, the encoding table may be compiled in advance of the image capture with the same table of values utilized for all images captured.

Figure 4:
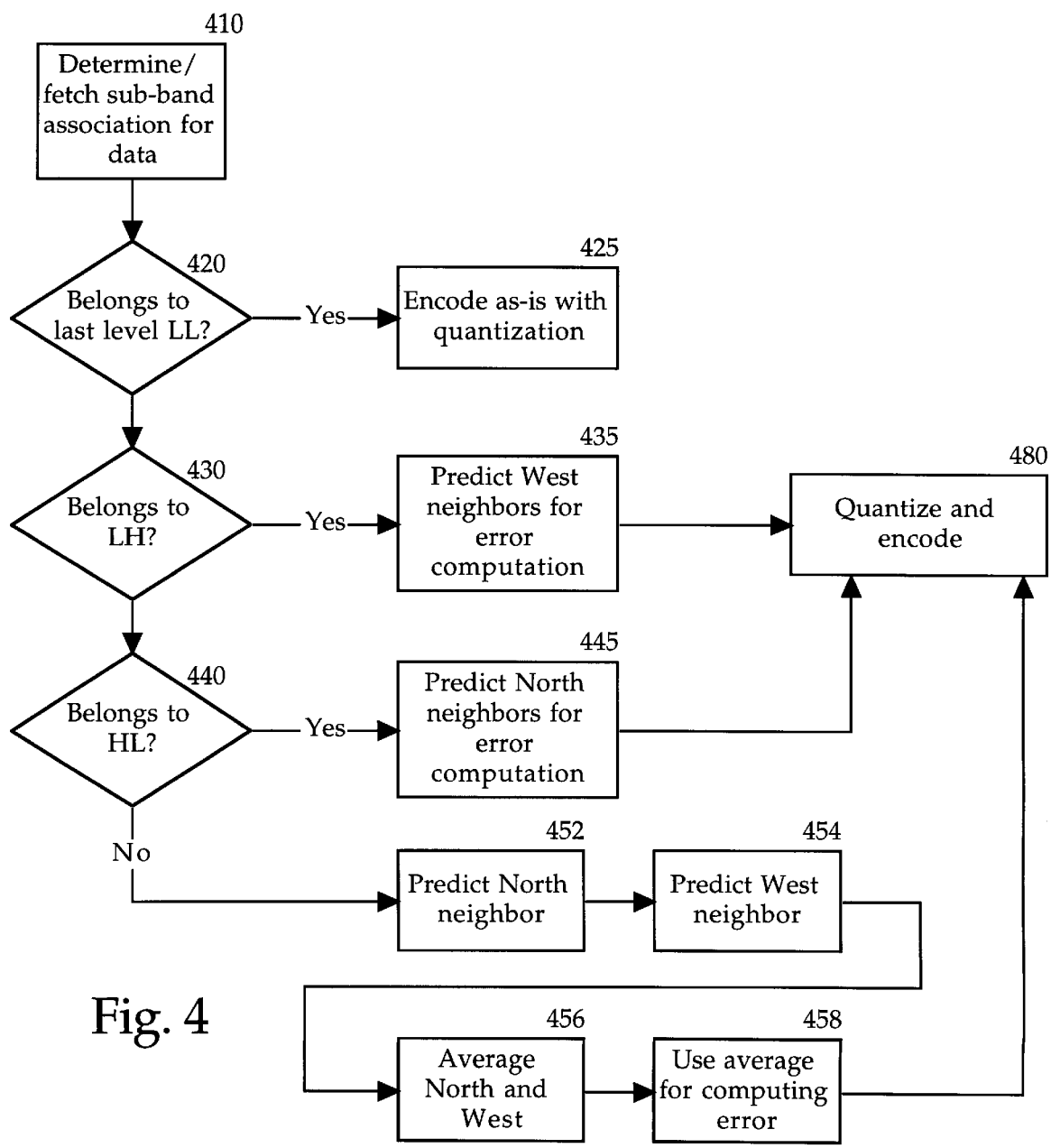
FIG. 4 is a flow diagram of one or more embodiments of the invention.

FIG. 4 is a flow diagram of one or more embodiments of the invention.

The first stage in directional predictive coding is to determine/fetch the sub-band association of the data to be quantized and encoded (block 410). A set of control signals may be fetched that contain the association or the association may be determined based on counters and state control mechanisms tracking which data (row and column position). If the data value is found to be associated with the LL sub-band (block 420), then the data value is binary encoded directly without quantization or error encoding (block 425). The LL sub-band belongs to the last level of the DWT (since other levels resolve their LL sub-bands further into four more sub-bands for the next level) and thus needs to be preserved as-is since it contains most of the critical image information. If the sub-band association is LH (block 430), then west neighbors need to be predicted for error computation (block 435) since the edge information is horizontal in orientation. After the prediction and error computation, the data can be quantized and encoded (block 480). If the sub-band association of the data is HL (block 440), then north neighbors need to be predicted for error computation (block 445) since the edge information is vertical in orientation. After the prediction and error computation, the data can be quantized and encoded (block 480). This methodology may readily be modified for other image compression such that the directional property of an input data set may be fetched or determined and errors computed in a manner concordant with the directional property.

If none of the above associations are found, then the data must be associated with the HH sub-band. In that case, the data will be more highly correlated in a diagonal direction, and both a west neighbor (block 452) and north neighbor (block 454) need to be predicted. These predicted neighbors are then averaged together (block 456). This averaged value is then subtracted from the input sub-band data to generate the error value (block 458). The error value is quantized and encoded (block 480).

Figure 5:
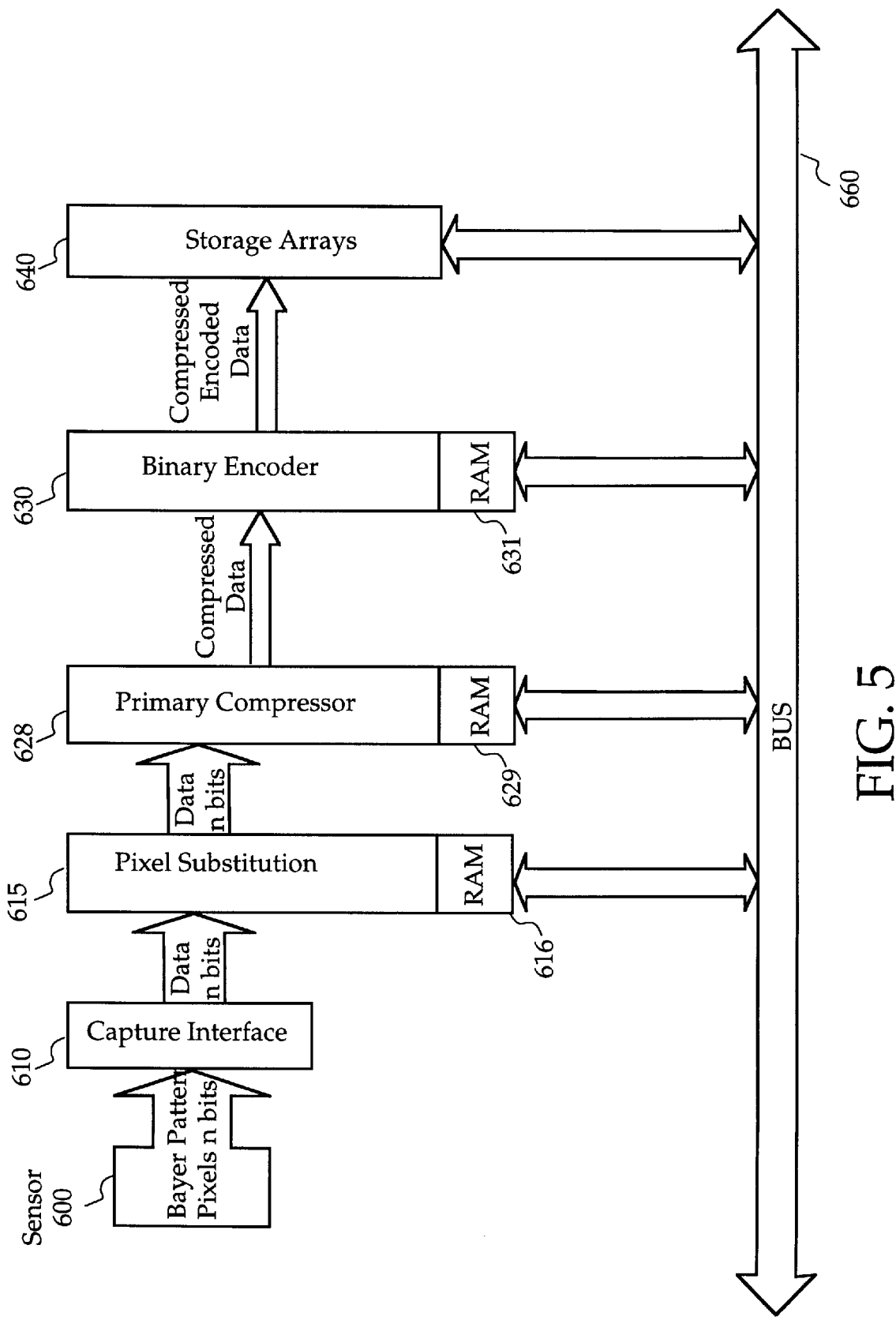
FIG. 5 is a block diagram of an image processing apparatus according to an embodiment of the invention.

FIG. 5 is a block diagram of an image processing apparatus according to an embodiment of the invention.

FIG. 5 is a block diagram of internal image processing components of an imaging device incorporating at least one embodiment of the invention including an adaptive encoder. In the exemplary circuit of FIG. 5, a sensor 600 generates pixel components which are color/intensity values from some scene/environment. The n-bit pixel values generated by sensor 600 are sent to a capture interface 610. Sensor 600 in the context relating to the invention will typically sense one of either R, G, or B components from one "sense" of an area or location. Thus, the intensity value of each pixel is associated with only one of three color planes and may form together a Bayer pattern raw image. Capture interface 610 resolves the image generated by the sensor and assigns intensity values to the individual pixels. The set of all such pixels for the entire image is in a Bayer pattern in accordance with typical industry implementation of digital camera sensors.

It is typical in any sensor device that some of the pixel cells in the sensor plane may not respond to the lighting condition in the scene/environment properly. As a result, the pixel values generated from these cell may be defective. These pixels are called "dead pixels." The "pixel substitution" unit 615 replaces each dead pixel by the immediate previously valid pixel in the row. A RAM 616 consists of the row and column indices of the dead pixels, which are supplied by the sensor. This RAM 616 helps to identify the location of dead pixels in relation to the captured image.

A primary compressor 628 receives sensor image data and performs image compression in accordance with one or more embodiments of the invention. A RAM 629 can be used to store DWT coefficients and/or quantization thresholds for each channel/sub-band as desired in executing the compression techniques described in the DWT patent. Primary compressor 628 utilizes directional predictive coding as described above and thus reduces the total size of the encoded data by exploiting the known data correlation as a result of applying a 2-D DWT to the raw image. The DWT transformation may need to output data temporarily to the RAM 629 during the directional entropy encoding process, depending upon the desired level of real-time performance.

Primary compressor 628 can be designed to provide compressed and directionally predictive coded outputs to a binary encoder 630. Binary encoder 630 can be equipped to carry out a variety of binary encoding schemes, such as Modified Huffman Coding. Binary encoder 630 provides the encoded and compressed data to storage arrays 640.

Each of the RAM tables 616, and 629 can directly communicate with a bus 660 so that their data can be loaded and then later, if desired, modified. Further, those RAM tables and other RAM tables may be used to store intermediate result data as needed.

Figure 6:
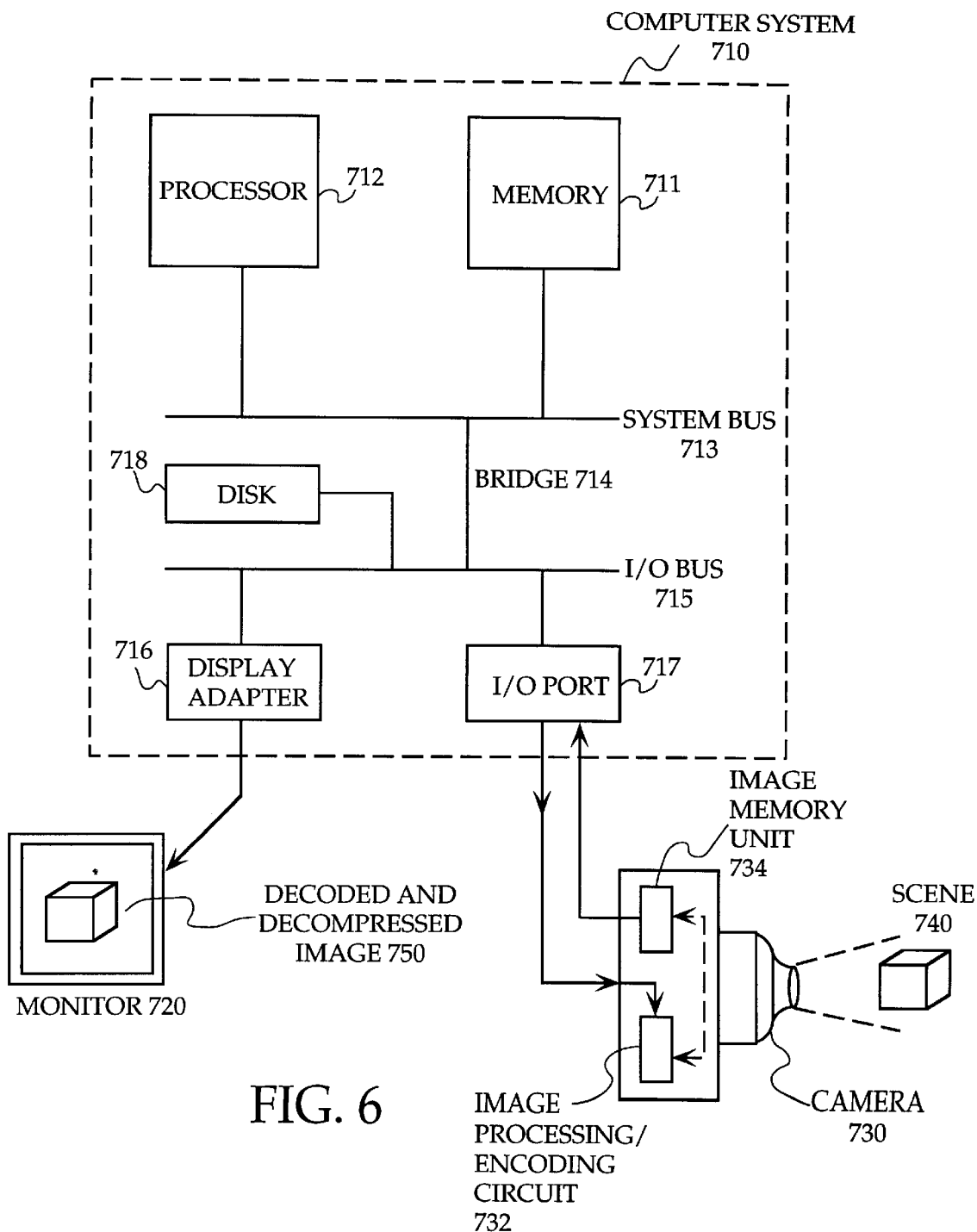
FIG. 6 is a system diagram of one embodiment of the invention.

FIG. 6 is a system diagram of one embodiment of the invention.

Illustrated is a computer system 710, which may be any general or special purpose computing or data processing machine such as a PC (personal computer), coupled to a camera 730. Camera 730 may be a digital camera, digital video camera, or any image capture device or imaging system, or combination thereof and is utilized to capture an image of a scene 740. Essentially, captured images are processed by an image processing circuit 732 so that they can be efficiently stored in an image memory unit 734, which may be a ROM, RAM or other storage device such as a fixed disk. The image contained within image memory unit 734 that is destined for computer system 710 can be according to one embodiment of the invention, stored directly as compressed and directionally predictive coded data. In most digital cameras that can perform still imaging, images are stored first and downloaded later. This allows the camera 730 to capture the next object/scene quickly without additional delay. The invention in its various embodiments, particularly in providing a compressed image that is directly converted from the captured 8-bit Bayer pattern, reduces the computation requirements of the camera 730 and the associated costs, allowing for a more inexpensive camera.

The image processing circuit 732 carries out the compression and directional predictive coding. When a compressed and encoded image is downloaded to computer system 710, it may be decoded and then rendered to some output device such as a printer (not shown) or to a monitor device 720. Image decoding may be achieved using a processor 712 such as the Pentium™ (a product of Intel Corporation) Processor and a memory 711, such as RAM, which is used to store/load instruction addresses and result data.

In an alternate embodiment, the directional predictive coding techniques described above may be achieved in a software application running on computer system 710 rather than directly in camera 730. In such an embodiment, the image processing circuit may advantageously store only the compressed image. The application(s) used to perform the encoding and/or decoding after download from camera 730 may be from an executable compiled from source code written in a language such as C++. The instructions of that executable file, which correspond with instructions necessary to scale the image, may be stored to a disk 718 or memory 711. Further, such application software may be distributed on a network or a computer-readable medium for use with other systems.

When an image, such as an image of a scene 740, is captured by camera 730, it is sent to the image processing circuit 732. Image processing circuit 732 consists of ICs and other components which execute, among other functions, the adaptive encoding of a compressed image. The image memory unit 734 will store the compressed and encoded data. Once all pixels are processed and stored or transferred to the computer system 710 for rendering the camera 730 is free to capture the next image. When the user or application desires/requests a download of images, the encoded image data in the image memory unit, are transferred from image memory unit 734 to the I/O port 717. I/O port 717 uses the bus-bridge hierarchy shown (I/O bus 715 to bridge 714 to system bus 713) to temporarily store the data into memory 711 or, optionally, disk 718. Computer system 710 has a system bus 713 which facilitates information transfer to/from the processor 712 and memory 711 and a bridge 714 which couples to an I/O bus 715. I/O bus 715 connects various I/O devices such as a display adapter 716, disk 718 and an I/O port 717, such as a serial port. Many such combinations of I/O devices, buses and bridges can be utilized with the invention and the combination shown is merely illustrative of one such possible combination.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A method comprising:

determining a direction of most probable correlation of a transformed set of image data obtained using a Discrete Wavelet Transform (DWT), said transformed set being one of a plurality of sub-bands generated from said DWT;

generating an error set based on said transformed set of image data by generating an error value and a recovered error value, wherein the recovered error value is obtained by quantizing and inverse quantizing said error value; and encoding some of the error set, the encoding being applied in the determined direction of most probable correlation.

2. A method according to claim 1 wherein one of said sub-bands is the LL sub-band.

3. A method according to claim 1 wherein one of said sub-bands is an HL sub-band, said HL sub-band having vertical direction of most probable correlation, the error encoding considering a north predicted neighbor data value when determining the error.

4. A method according to claim 1 wherein one of said sub-bands is an HH sub-band, said HH sub-band having diagonal direction of most probable correlation, the error encoding considering an average value of a west predicted neighbor data value and a north predicted neighbor data value when determining the error.

5. A method according to claim 1 wherein error encoding includes determining the sub-band association of transformed data.

6. A method according to claim 1 further comprising:
quantizing the error; and
reducing the propagation of loss due to quantizing of the error.

7. A method according to claim 6 wherein reducing the propagation of quantization loss includes:
inverse quantizing the quantized error value to generate a recovered error value;
feeding back and summing said recovered error value with the predicted neighbor data previously obtained, said sum constituting the current predicted neighbor data.

8. A method according to claim 1 wherein one of the sub-bands is an LH sub-band, said LH sub-band having horizontal direction of most probable correlation, the error encoding considering a west predicted neighbor data value when determining the error.

9. The method of claim 1 further comprising:
quantizing said transformed set before generating the error set.

10. The method of claim 1 further comprising:
quantizing said error set before encoding some of said error set.

11. An imaging system comprising:
a processor, said processor configured to determine a direction of highest correlation in a DWT transformed set of image data based on the direction of image edges and to generate an error set based on said transformed set by generating an error value and a recovered error value, wherein the recovered error value is obtained by quantizing and inverse quantizing said error value, said processor further configured to directionally encode some of said error set; and
a memory coupled to said processor, said memory configured to store said directionally encoded error set.

12. A system according to claim 11 wherein said DWT result data is the result of applying a 9-7 bi-orthogonal splines filter DWT upon an input image captured by said imaging system.

13. An article comprising a computer readable medium having instructions stored thereon which when executed causes:
determining a direction of most probable correlation of a transformed set of image data obtained using a Discrete Wavelet Transform (DWT), said transformed set being one of a plurality of sub-bands generated from said DWT;
generating an error set based on said transformed set of image data by generating an error value and a recovered error value, wherein the recovered error value is obtained by quantizing and inverse quantizing said error value; and
encoding some of the error set, the encoding being applied in the determined direction of most probable correlation.

14. An article according to claim 13, wherein one of said sub-bands is the LL sub-band.

15. An article according to claim 13, wherein one of said sub-bands is an HL sub-band, said HL sub-band having vertical direction of most probable correlation, the error encoding considering a north predicted neighbor data value when determining the error.

16. An article according to claim 13, wherein one of said sub-bands is an HH sub-band, said HH sub-band having diagonal direction of most probable correlation, the error encoding considering an average value of a west predicted neighbor data value and a north predicted neighbor data value when determining the error.

17. An article according to claim 13, wherein error encoding includes determining the sub-band association of transformed data.

18. An article according to claim 13, further comprising:
quantizing the error; and
reducing the propagation of loss due to quantizing of the error.

19. An article according to claim 13, wherein reducing the propagation of quantization loss includes:
inverse quantizing the quantized error value to generate a recovered error value;
feeding back and summing said recovered error value with the predicted neighbor data previously obtained, said sum constituting the current predicted neighbor data.

20. An article according to claim 13 wherein one of the sub-bands is an LH sub-band, said LH sub-band having horizontal direction of most probable correlation, the error encoding considering a west predicted neighbor data value when determining the error.

* * * * *

UNITED STATES PATENT AND TRADEMARK OFFICE
CERTIFICATE OF CORRECTION

PATENT NO. : 6,233,358 B1
DATED : May 15, 2001
INVENTOR(S) : Tinku Acharya

It is certified that error appears in the above-identified patent and that said Letters Patent is hereby corrected as shown below:

Column 7,
Line 36, delete "$X_{11,1}$-$\Delta$ $R_{10,1}$ $R_{10}$." and insert -- $X_{11,1}$-$\Delta$ $R_{10,1}$. --.

Signed and Sealed this

Seventh Day of May, 2002

Attest:

JAMES E. ROGAN
Attesting Officer    Director of the United States Patent and Trademark Office